United States Patent
Cheng et al.

(10) Patent No.: US 9,720,457 B1
(45) Date of Patent: Aug. 1, 2017

(54) SOLID STATE DISK

(71) Applicant: ALSON TECHNOLOGY LIMITED, Kowloon, OT (HK)

(72) Inventors: Han-Hung Cheng, Zhubei (TW); Chi-Fen Kuo, Zhubei (TW); Wei-Di Cheng, Zhubei (TW)

(73) Assignee: ALSON TECHNOLOGY LIMITED, Kowloon (HK)

( * ) Notice: Subject to any disclaimer, the term of this patent is extended or adjusted under 35 U.S.C. 154(b) by 0 days.

(21) Appl. No.: 15/188,282

(22) Filed: Jun. 21, 2016

(51) Int. Cl.
*F21V 23/04* (2006.01)
*G06F 1/18* (2006.01)

(52) U.S. Cl.
CPC .................. *G06F 1/181* (2013.01)

(58) Field of Classification Search
CPC .... G06F 1/181; F21V 23/0442; F21V 23/003; F21V 23/005; G09F 13/00; G09F 13/04; G09F 13/22
See application file for complete search history.

(56) References Cited

U.S. PATENT DOCUMENTS

2014/0006603 A1* 1/2014 Yang .................. G06F 11/3034 709/224
2014/0372778 A1* 12/2014 Tian .................... G06F 13/4081 713/322

\* cited by examiner

*Primary Examiner* — Thomas M Sember
(74) *Attorney, Agent, or Firm* — Muncy, Geissler, Olds & Lowe, P.C.

(57) ABSTRACT

A solid state disk is provided, including: a main body, including a shell portion having a light-penetrable shell portion, a substrate disposed on the shell portion and a memory module disposed on the substrate, the substrate having a light-penetrable portion and a first face and integrally formed with the light-penetrable portion, the first face having a first coating layer which has an emergent light-penetrable portion, the light-penetrable shell portion corresponding to the emergent light-penetrable portion, the substrate including a transmission port, the memory module electrically connected to the transmission port; a light-emitting portion, buried in the substrate and electrically connected to the transmission port, a light emitted from the light-emitting portion being capable of being projected toward an interior of the substrate to the light-penetrable portion and the emergent light-penetrable portion and via the light-penetrable shell portion to an exterior of the solid state disk.

9 Claims, 4 Drawing Sheets

SOLID STATE DISK

BACKGROUND OF THE INVENTION

Field of the Invention

The present invention relates to a solid state disk.

Description of the Prior Art

Conventionally, a solid state disk is provided with a light-emitting device like LED for reminding or decoration.

However, in the conventional solid state disk, a light-emitting portion is disposed on a substrate, and the light-emitting portion occupies space and make a configuration space of a memory module smaller so that the substrate may appear crowded and disordered. In addition, a scattering structure needs to be provided additionally for making a light emitted from the light-emitting portion even. However, the scattering structure often occupies a lot of space, if the scattering structure is disposed on the substrate, the substrate becomes crowded, and a heat dissipation effect of the memory module on the substrate is influenced; if the scattering structure is not provided, it is hard for the light emitted from the light-emitting portion to create an evenness effect.

The present invention has arisen to mitigate and/or obviate the afore-described disadvantages.

SUMMARY OF THE INVENTION

The major object of the present invention is to provide a solid state disk which does not need additional space on the substrate for a light-emitting portion and a light-guiding portion to be disposed thereon and can emit an even and soft light without a scattering structure and create a comfortable visual effect.

To achieve the above and other objects, a solid state disk is provided, including: a main body, including a shell portion, a substrate which is disposed on the shell portion and a memory module which is disposed on the substrate, the shell portion having a light-penetrable shell portion, the substrate having a light-penetrable portion and a first face, the substrate integrally formed with the light-penetrable portion, the first face having a first coating layer, the first coating layer having an emergent light-penetrable portion corresponding to the light-penetrable portion, the light-penetrable shell portion corresponding to the emergent light-penetrable portion, the substrate including a transmission port, the memory module electrically connected to the transmission port; a light-emitting portion, buried in the substrate and electrically connected to the transmission port, a light emitted from the light-emitting portion being capable of being projected toward an interior of the substrate to the light-penetrable portion and the emergent light-penetrable portion and via the light-penetrable shell portion to an exterior of the solid state disk.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
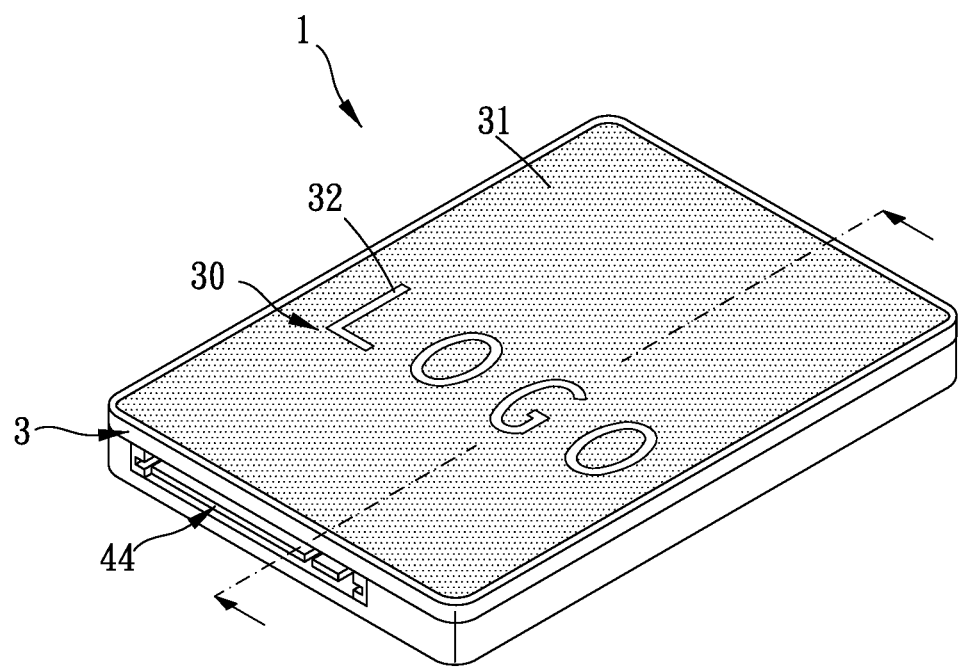
FIG. 1 is a stereogram of a preferred embodiment of the present invention.
Figure 2:
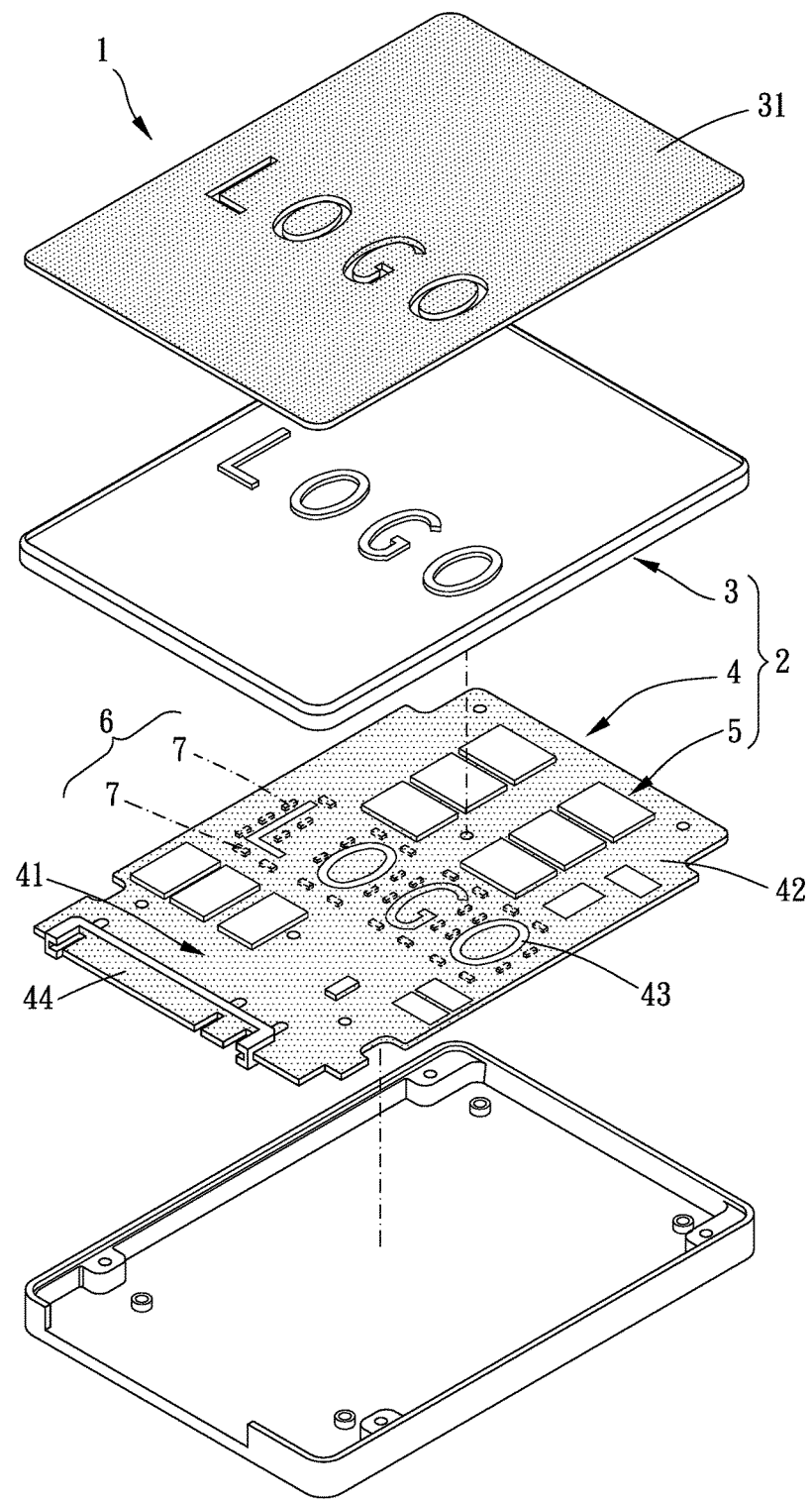
FIG. 2 is a breakdown view of the preferred embodiment of the present invention.
Figure 3:
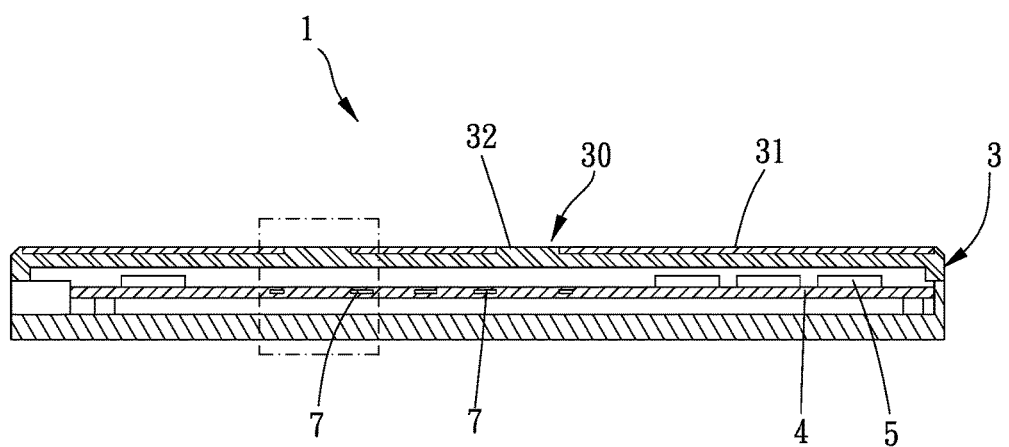
FIG. 3 is a cross-sectional side view of the preferred embodiment of the present invention.
Figure 4:
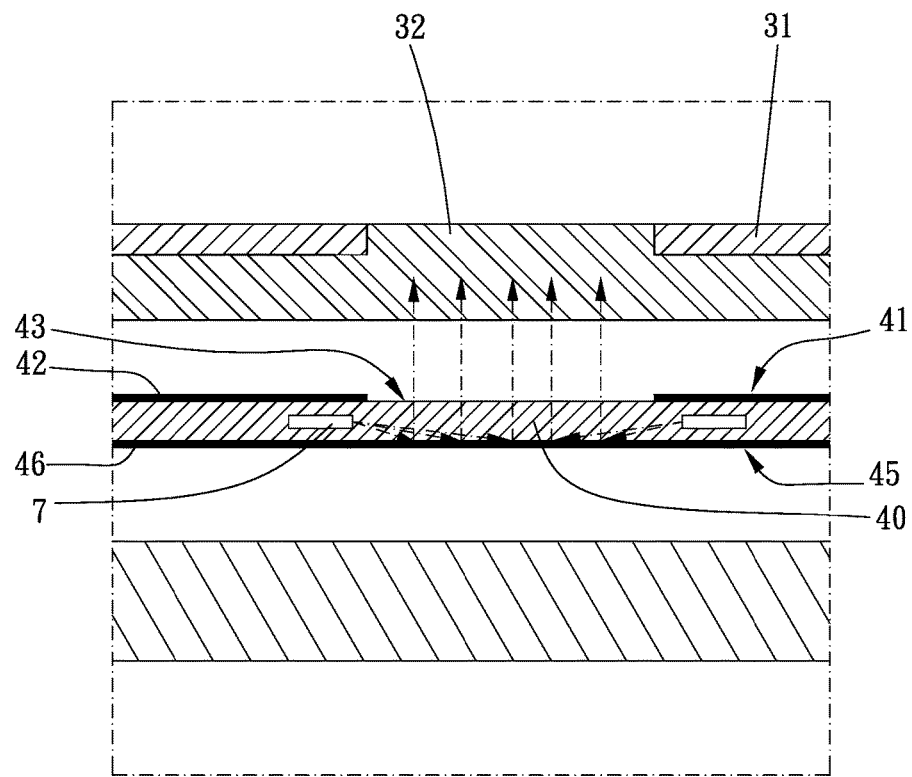
FIG. 4 is a partially-enlarged view of FIG. 3.
Figure 5:
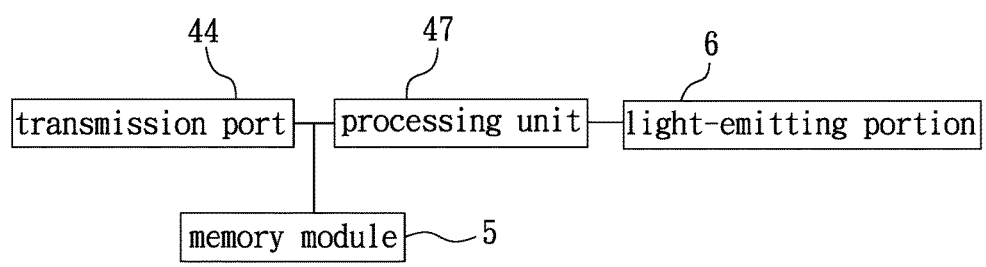
FIG. 5 is a diagram showing a structural relationship of the preferred embodiment of the present invention.

Please refer to FIGS. 1 to 5 for a preferred embodiment of the present invention. A solid state disk 1 includes a main body 2 and a light-emitting portion 6.

The main body 2 includes a shell portion 3, a substrate 4 which is disposed on the shell portion 3 and a memory module 5 which is disposed on the substrate 4, the shell portion 3 has a light-penetrable shell portion 30, the substrate 4 has a light-penetrable portion 40 and a first face 41, the substrate 4 is integrally formed with the light-penetrable portion 40, the first face 41 has a first coating layer 42 (preferably not light-penetrable), the first coating layer 42 has an emergent light-penetrable portion 43 corresponding to the light-penetrable portion 40, the light-penetrable shell portion 30 corresponds to the emergent light-penetrable portion 43, the substrate 4 includes a transmission port 44, and the memory module 5 is electrically connected to the transmission port 44. Specifically, the transmission port 44 can transmit not only electricity but also data. The light-emitting portion 6 is buried in the substrate 4 and electrically connected to the transmission port 44, and the light emitted from the light-emitting portion 6 can be projected toward an interior of the substrate 4 to the light-penetrable portion 40 and the emergent light-penetrable portion 43 and via the light-penetrable shell portion 30 to an exterior of the solid state disk 1. Therefore, there is no need of space on two sides of surfaces of the substrate 4 for the light-emitting portion 6 to be disposed thereon, the light emitted from the light-emitting portion 6 can be weakened, evened and soften by the light-penetrable portion 40 and be projected out to present a comfortable visual effect (after a part of the coating layer on the substrate which carries a circuit is removed, a part of the substrate is light-penetrable (preferably the substrate is translucent) to create an evenness effect).

In this embodiment, the light-penetrable shell portion 30 includes a decoration plate 31 on the shell portion 3 and a light-penetrable pattern portion 32 (for example, a trademark) disposed on the decoration plate 31, the light-penetrable pattern portion 32 can add beauty to the solid state disk 1, and preferably, the light-penetrable pattern portion 32 may not be hollow-out and be a layer made of a transparent material (for example but not limited thereto, a light-penetrable glass) so as to prevent dust from entering an interior of the solid state disk 1. The emergent light-penetrable portion 43 and the light-penetrable pattern portion 32 correspond to each other in position and shape; therefore, in actual practice, as viewed from a side of the solid state disk 1 tiltedly, a user can see from the light-penetrable pattern portion 32 that the first coating layer 42 is located on an edge of a contour of the light-penetrable pattern portion 32 and form a light shading so as to create a gradient visual effect.

The substrate 4 further has a second face 45 opposite to the first face 41, the substrate 4 further includes a second coating layer 46 on the second face 45, the second coating layer 46 completely covers a part of the second face 45 corresponding to the light-penetrable portion 40, the first coating layer 42 and the second coating layer 46 completely cover the light-emitting portion 6, the second coating layer 46 is for reflecting the light emitted from the light-emitting portion 6 and make the light be projected toward the emergent light-penetrable portion 43, and the first and second coating layers 42, 46 can prevent the light from penetrating through the light-penetrable portion 40 before being evened (for example, being refracted, reflected, or scattered) so as to avoid the problem that the light projected from the emergent light-penetrable portion 43 is not even enough. The light-emitting portion 6 includes a plurality of light-emitting diodes 7 which are disposed on the substrate 4 and substantially along a contour of the emergent light-penetrable portion 43 so as to prevent the light projected from the light-penetrable shell portion 30 from being uneven, and the light-emitting diodes 7 can save electricity and emit light stably. The light-emitting portion 6 is emittable in any of at least two kinds of light in different colors so as to enrich the color variations of the solid state disk 1 and to produce a unique visual effect. The substrate 4 is further provided with a processing unit 47, the processing unit 47 is electrically connected to the light-emitting portion 6, and the light-emitting portion 6 is controllable by the processing unit 47 to create different light variations when the solid state disk 1 is in operation.

In other embodiments, the emergent light-penetrable portion may be greater than the light-penetrable pattern portion in dimension so that the light projected from the light-penetrable pattern portion may be more even so as to prevent the light projected from a center portion and the edge of the contour of the light-penetrable pattern portion from being uneven; the second coating layer may partially cover the part of the second face corresponding to the light-penetrable portion; the first and second coating layers may respectively and optionally cover the light-emitting portion partially or completely; a part of the second coating layer opposite to the light-penetrable portion may be provided with a scattering structure additionally, or the scattering structure may be buried in the substrate; the emergent light-penetrable portion and the light-penetrable pattern portion may not correspond to each other; the shell portion may not have the decoration plate, the light-penetrable pattern portion may be directly disposed on the shell portion, or the shell portion and the decoration plate may be integrally formed; the light-penetrable pattern portion of the solid state disk may be a hollow-out structure; the substrate may further include other devices, for example (but not limited thereto), a special device like a transmission speed detection unit to increase the functionality of the solid state disk; the light-emitting portion may also include other mechanisms which can provide light; the light-emitting portion may produce only one color of light.

Given the above, the substrate of the solid state disk can save space. The light-penetrable portion of the solid state disk can emit an even and soft light, and the light-penetrable portion and the light-penetrable pattern portion of the solid state disk can provide a special visual effect.

While we have shown and described various embodiments in accordance with the present invention, it should be clear to those skilled in the art that further embodiments may be made without departing from the scope of the present invention.

What is claimed is:

1. A solid state disk, including:
a main body, including a shell portion, a substrate which is disposed on the shell portion and a memory module which is disposed on the substrate, the shell portion having a light-penetrable shell portion, the substrate having a light-penetrable portion and a first face, the substrate integrally formed with the light-penetrable portion, the first face having a first coating layer, the first coating layer having an emergent light-penetrable portion corresponding to the light-penetrable portion, the light-penetrable shell portion corresponding to the emergent light-penetrable portion, the substrate including a transmission port, the memory module electrically connected to the transmission port;
a light-emitting portion, buried in the substrate and electrically connected to the transmission port, a light emitted from the light-emitting portion being capable of being projected toward an interior of the substrate to the light-penetrable portion and the emergent light-penetrable portion and via the light-penetrable shell portion to an exterior of the solid state disk.

2. The solid state disk of claim 1, wherein the light-penetrable shell portion includes a decoration plate on the shell portion and a light-penetrable pattern portion disposed on the decoration plate.

3. The solid state disk of claim 2, wherein the emergent light-penetrable portion and the light-penetrable pattern portion correspond to each other in position and shape.

4. The solid state disk of claim 1, wherein the first coating layer at least covers a part of the light-emitting portion.

5. The solid state disk of claim 1, wherein the substrate further has a second face opposite to the first face, the substrate further includes a second coating layer on the second face, and the second coating layer at least covers a part of the light-emitting portion.

6. The solid state disk of claim 1, wherein the light-emitting portion includes a plurality of light-emitting diodes which are disposed on the substrate and substantially along a contour of the emergent light-penetrable portion.

7. The solid state disk of claim 1, wherein the light-emitting portion is emittable in any of at least two kinds of light in different colors.

8. The solid state disk of claim 1, wherein the substrate is further provided with a processing unit, the processing unit is electrically connected to the light-emitting portion, and the light-emitting portion is controllable by the processing unit.

9. The solid state disk of claim 1, wherein the light-penetrable shell portion includes a decoration plate on the shell portion and a light-penetrable pattern portion disposed on the decoration plate; the emergent light-penetrable portion and the light-penetrable pattern portion correspond to each other in position and shape; the substrate further has a second face opposite to the first face, the substrate further includes a second coating layer on the second face, the second coating layer completely covers a part of the second face corresponding to the light-penetrable portion, and the first coating layer and the second coating layer completely cover the light-emitting portion; the light-emitting portion includes a plurality of light-emitting diodes which are disposed on the substrate and substantially along a contour of the emergent light-penetrable portion; the light-emitting portion is emittable in any of at least two kinds of light in different colors; the substrate is further provided with a processing unit, the processing unit is electrically connected to the light-emitting portion, and the light-emitting portion is controllable by the processing unit.

* * * * *